United States Patent [19]

Sheehan

[11] Patent Number: 4,892,123

[45] Date of Patent: Jan. 9, 1990

[54] PNEUMATIC CONVEYING SYSTEM

[75] Inventor: Patrick G. Sheehan, Mid Glamorgan, United Kingdom

[73] Assignee: Technivac Limited, Mid Glamorgan, United Kingdom

[21] Appl. No.: 236,465

[22] Filed: Aug. 25, 1988

[30] Foreign Application Priority Data

Aug. 25, 1987 [GB] United Kingdom ............... 8719993
Aug. 25, 1987 [GB] United Kingdom ............... 8719994

[51] Int. Cl.⁴ ............................................. B65B 1/16
[52] U.S. Cl. ..................................... 141/7; 141/44; 141/59; 141/65; 406/106; 55/261; 55/467
[58] Field of Search ............... 141/1, 4, 5, 7, 8, 10, 141/44, 45, 59, 65, 66, 67, 250, 263, 279; 406/106, 197; 55/467, 261

[56] References Cited

U.S. PATENT DOCUMENTS

| | | | |
|---|---|---|---|
| 3,720,241 | 3/1973 | Bryant et al. | 406/106 |
| 3,809,438 | 5/1974 | Hubbard | 406/106 |
| 3,911,971 | 10/1975 | Smithson et al. | 141/1 |
| 3,945,561 | 3/1976 | Stoeffler | 141/67 |
| 3,963,062 | 6/1976 | Stahl | 141/67 |
| 3,964,528 | 6/1976 | Smithson et al. | 141/67 |
| 4,073,628 | 2/1978 | Gerhardt et al. | 141/67 X |
| 4,312,388 | 1/1982 | Hager et al. | 141/1 |

*Primary Examiner*—Ernest G. Cusick
*Attorney, Agent, or Firm*—Rodman & Rodman

[57] ABSTRACT

In a system for discharging particulate material from a reactor, the material is conveyed pneumatically from a drain zone of the reactor via a first vacuum line to a gas/solids separator and solids we fed from the separator to a receiving vessel via a gas-tight line and an inlet port provided on a cover member sealingly engaged with the top of the vessel. The majority of the gas is re-cycled from the separator to the drain zone via a main vacuum return line and the remainder of gas is drawn from the separator to the receiving vessel via a further vacuum line and a gas inlet provided on the cover member. Gas is passed from the receiving vessel to the main vacuum return line via an outlet port provided on the cover member and an auxiliary vacuum return line. The cover member is mounted for movement towards and away from the receiving vessel so that successive receiving vessels can be covered by the cover member and filled with separated solids.

11 Claims, 7 Drawing Sheets

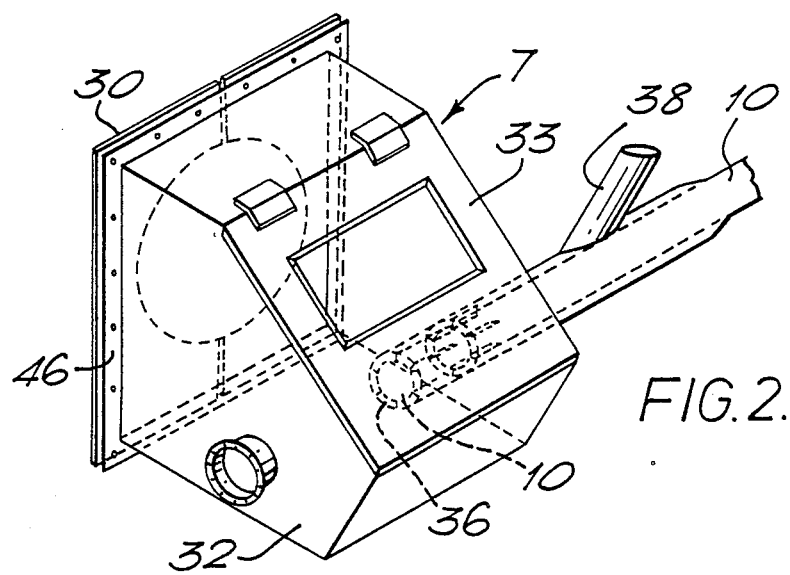
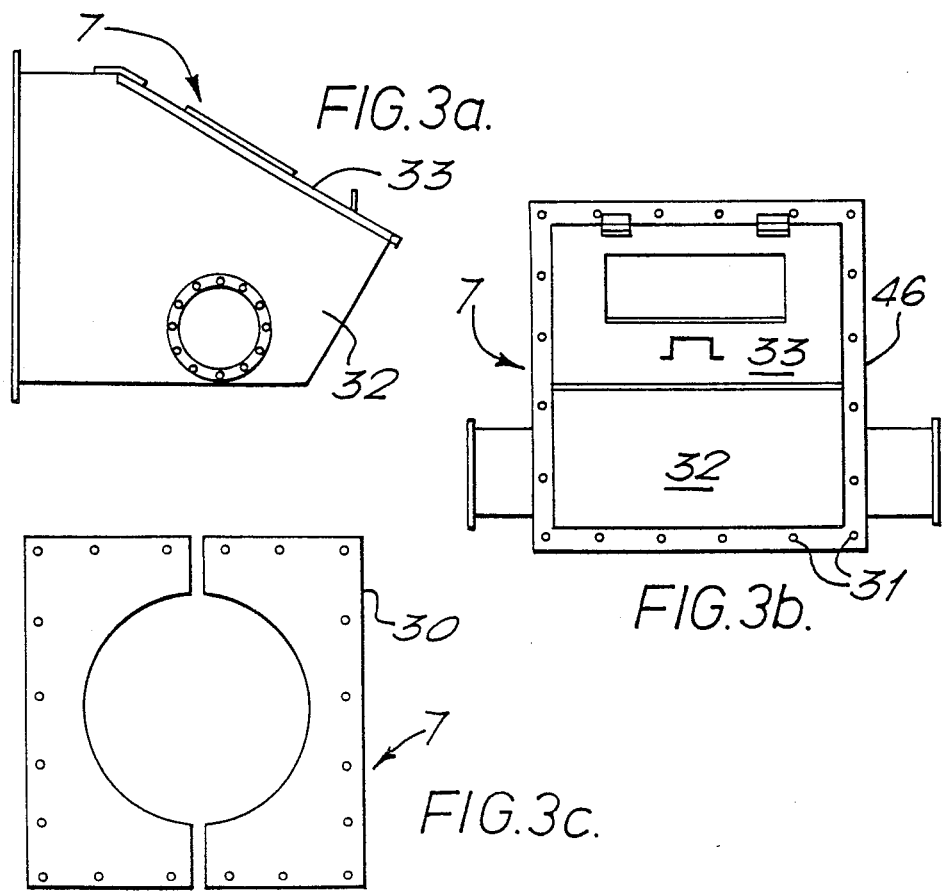

PNEUMATIC CONVEYING SYSTEM

The present invention is concerned with a method and apparatus for conveying solids.

BACKGROUND OF THE INVENTION

Particulate solids are conventionally conveyed pneumatically using high velocity air or gas under negative pressure (vacuum). Such pneumatic conveying systems are used extensively in the oil, gas, chemical and petrochemical industries to discharge catalyst pellets from reactors into drums, either to allow the catalyst to be changed or to permit internal inspection or repairs to be carried out within the reactor. When discharging catalyst pellets in this way, it is important to avoid dust evolution, because the catalytic material often contains volatile and inflammable hydrocarbons, toxic elements, or residual precious metals. Some catalytic material may be pyrophoric, and extruded catalyst pellets (which are now widely used) are relatively fragile and can be easily damaged during pneumatic conveying, rendering them unfit for further use.

An example of a pneumatic conveying system for use in discharging particulate catalyst from a reactor is disclosed in U.S. Pat. No. 4,312,388. In the system described in the latter document, catalyst is discharged from a catalytic reaction vessel into a drum or series of drums via a chute and a normally limp transfer hose connected to a dip pipe which extends from the top of a hood for the drum down into the interior thereof, so that when the level of solids reaches the level of the discharge end of the dip pipe, the transfer hose becomes rigid and therefore detectable by the operator.

While this system is believed to work generally quite well, it is necessary to operate with the drum at an elevated pressure relative to the remainder of the pneumatic lines; otherwise the normally limp transfer hose would collapse.

OBJECTS AND SUMMARY OF THE INVENTION

It is an object of the present invention to provide an improved method and apparatus for discharging particulate material from a reactor. In accordance with the present invention there is provided a method of discharging particulate material from a reactor, which comprises:

(a) pneumatically conveying said material from a drain zone of said reactor via a first vacuum line, to a gas/solids separator;

(b) feeding solids from said separator to a receiving vessel via a substantially gas-tight line and an inlet port provided on a cover member sealingly engaged with the top of said receiving vessel;

(c) recycling the majority of the gas from said separator to said drain zone via a main vacuum return line;

(d) drawing substantially the remainder of the gas from said separator to said receiving vessel via a further vacuum line and a gas inlet provided on said cover member;

(e) recycling gas from said receiving vessel, via an outlet port provided on said cover member and an auxiliary vacuum return line, to said main vacuum return line, said cover member being mounted for movement towards and away from said receiving vessel such that successive ones of a series of receiving vessels can be selectively covered by said cover member and filled with said solids.

Also in accordance with the present invention there is provided a system for discharging particulate material from a reactor, comprising:

(a) a first vacuum line for pneumatically conveying said material from a drain zone of said reactor to a gas/solids separator;

(b) a substantially gas-tight line for feeding solids from said separator to a receiving vessel via an inlet port provided on a cover member sealingly engaged with the top of said receiving vessel;

(c) a main vacuum return line for recycling the majority of the gas from the separator to said drain zone;

(d) a further vacuum line for drawing substantially the remainder of the gas from the separator to said receiving vessel via a gas inlet provided on said cover member; and (e) an auxiliary vacuum return line for passing gas from said receiving vessel, via an outlet port provided on said cover member, to said main vacuum return line, said cover member being mounted for movement towards and away from said receiving vessel such that successive ones of a series of receiving vessels can be selectively covered by said cover member and filled with said solids.

Preferably a hopper is provided, having an end plate fitting an outlet port of the reactor, a material outlet for removing material from the hopper, and a gas inlet.

In another preferred arrangement, a separating hopper is provided, having an inlet for the pneumatically conveyed solids, which inlet widens out into a central chamber where the solids tend to drop to the bottom, the central chamber being provided with a gas outlet or outlets at or near the top thereof and a solids outlet at or near the bottom thereof, the upper surface of the chamber being continuously curved away from the inlet.

DESCRIPTION OF THE DRAWINGS

Certain features of the present invention will now be described, by way of example only, with reference to the accompanying drawings in which:

FIG. 2 is a diagrammatic perspective view of an exemplary hopper suitable for use in the system of FIG. 1;

FIGS. 3a and 3b are respectively side elevation and front elevation on reduced scale of the hopper of FIG. 2;

FIG. 3c is a rear view of the back plate of the hopper of FIG. 2;

DETAILED DESCRIPTION OF INVENTION

Figure 1:
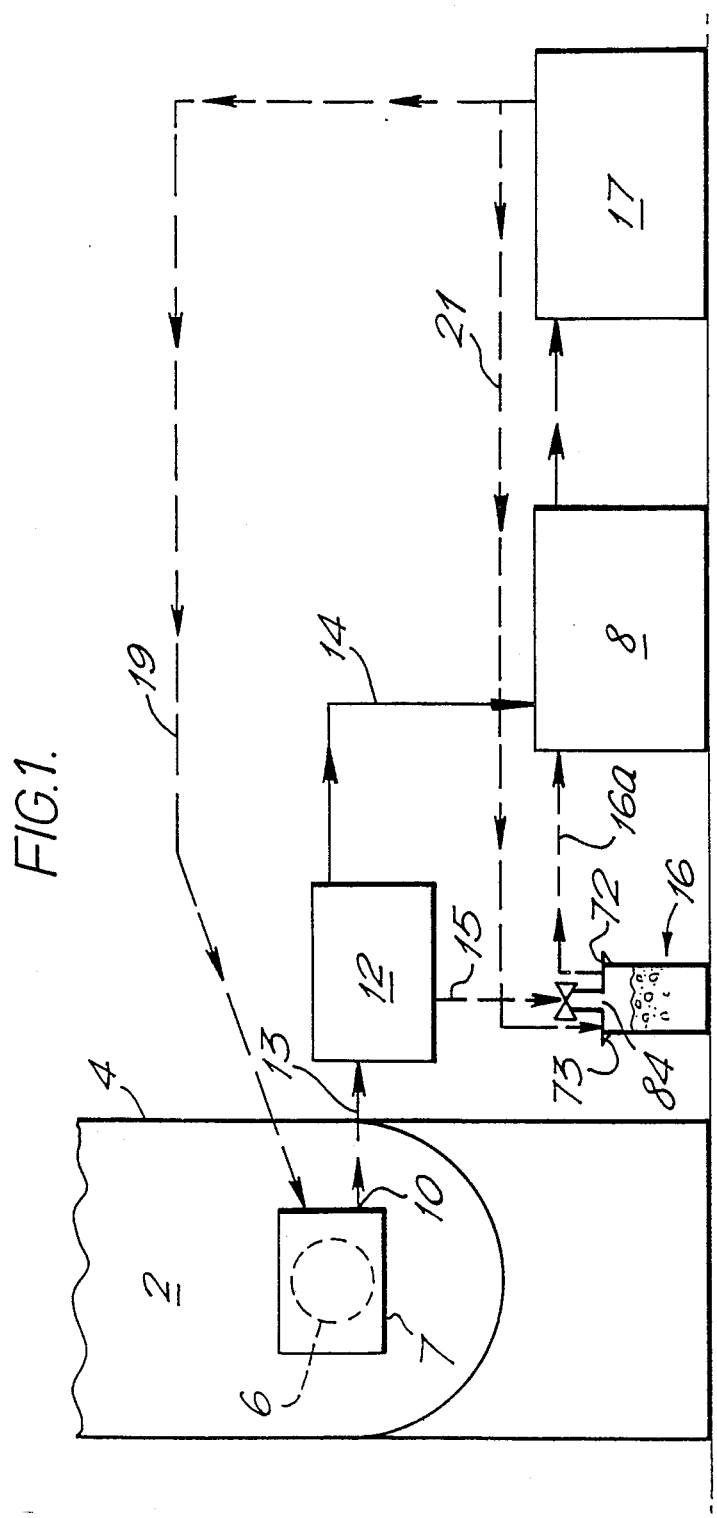
FIG. 1 is a schematic flow diagram of a system according to the invention for discharging particulate material from a reactor.

Referring to FIG. 1, catalyst material 2 is to be removed from a catalytic convertor or reactor 4. The convertor 4 has a lower port 6 which is surrounded by a closed hopper 7. As illustrated, the system is operated under an inert gas, (generally nitrogen), and is powered by a vacuum unit 8. Catalyst material 2 is withdrawn from an outlet port 10 of the hopper 7 and passed via a first vacuum line 13 to a separator 12 where the solids are separated from the gas. The gas returns via a main vacuum line 14 to the vacuum unit 8. The catalyst material 2 is passed down a tube 15 to an inlet port or main central opening 84 of drum filler unit 16. The gas is returned via a main vacuum return line 19 from the heat exchanger 17 to the hopper 7 in a closed loop.

The drum filler unit 16 has a cover member 72 sealed thereon, with any suitable known sealing member 73 at a substantially horizontal rim of the drum filler unit 16. A vacuum line 21 connects the main vacuum return line 19 to the drum filler unit 16 to provide a gas inlet flow into the drum filler unit 16 and a further vacuum line 16a connects the drum filler unit 16 to the vacuum unit 8.

Referring to FIGS. 2, 3a, 3b, and 3c, one form of hopper 7 for the system of FIG. 1 comprises a container body 32 having the outlet port 10 for the catalyst material and an inlet 36 for gas. The inlet 36 is in the form of an annular passage circumscribing the outlet port 10 and connected to a gas inlet pipe 38.

Figure 4:
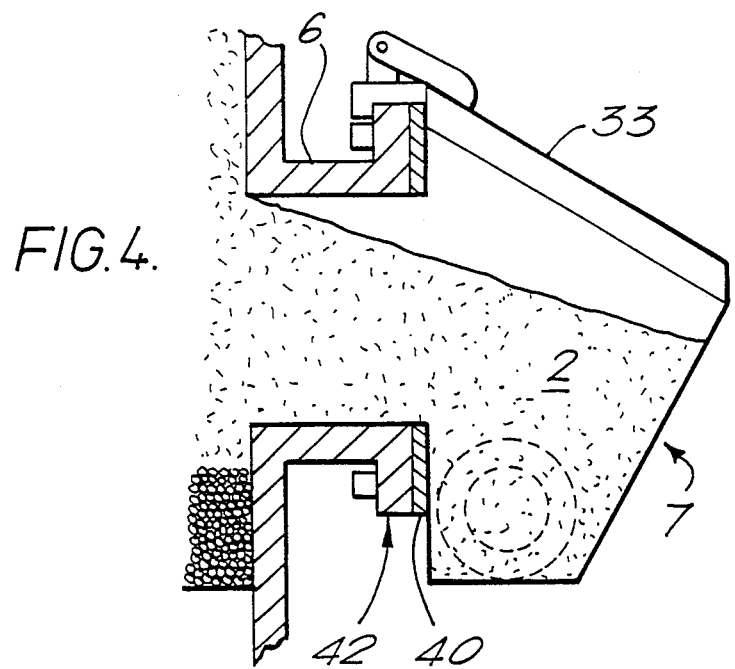
FIG. 4 is a side view of a second exemplary hopper suitable for use in the system of FIG. 1.

The hopper 7 has a split backplate 30 which can be assembled behind a flange 42 of the lower port 6 (FIG. 4). The rear of the container body 32 is also flanged at 46 whereby it can be affixed to the split backplate 30 by means of, for example bolts 31. A sealing arrangement 40 may be provided between the front face of the flange 46 and the rear face of the hopper 7 to prevent egress of material.

The container body 32 is provided with a hinged lid or hatch 33 which is large enough to allow access to, and allow the removal of, a cover plate (not shown) fitted to the outlet port 10.

In operation the split end plate 30 is located behind the flange 42 of bottom outlet port 6 of the convertor 4 and the remainder of the hopper 7 positioned adjacent the backplate 30 and secured thereto by means of bolts 31 through the flange 46. The seal 40 ensures a gas and dust tight connection. Prior to connecting the hopper 7 to the backplate 30, all but, say, two bolts 31 of the cover plate of the outlet port 10 may be removed. Once the hopper 7 is in place the lid or hatch 33 is opened, the remaining two bolts removed, and the cover plate withdrawn from the hopper 7. The hatch 33 is then closed and sealed. Catalyst material 2, from the convertor 4 then flows through the lower port 6 into the hopper 7 until it reaches its natural angle of repose (FIG. 4). If the catalyst material 2 is sensitive to ambient atmosphere then the hopper 7 can be purged with an inert gas such as nitrogen either before or after removing the cover plate.

Figure 5:
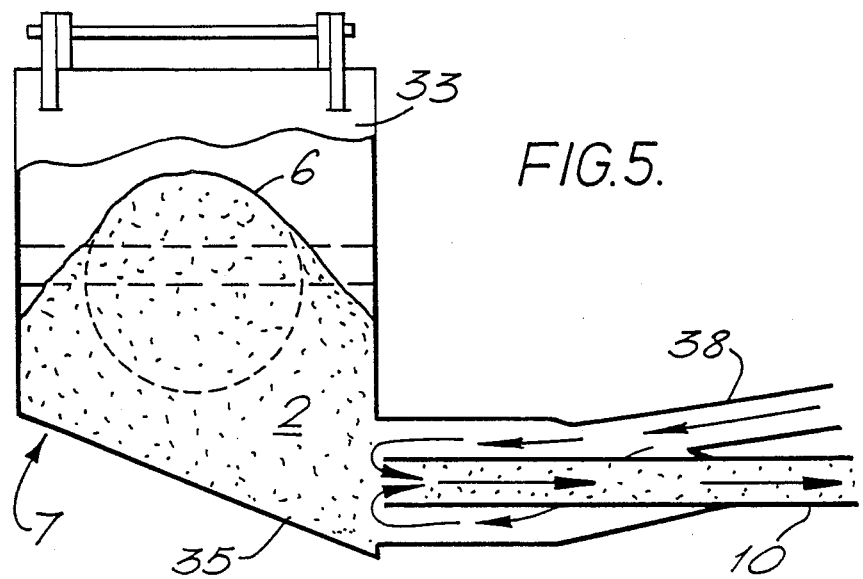
FIG. 5 is a front view of the hopper illustrated in FIG. 4.

In the embodiment of FIGS. 4 and 5, there is no split backplate but the container body 32 is bolted directly to the flange 42 and moreover has a bottom 35 (FIG. 5) which slopes towards the outlet 10.

The hoppers which have been described enable catalyst material to be emptied from the bottom 35 of the catalyst reactor 4, under inert conditions if required, and without the emission of dust. Furthermore the catalyst material 2 may be handled in such a way as to minimise attrition and therefore preserve the value for recycling or reclamation. Moreover, the hoppers 7 do not require an operative to go inside the container body 32, in contrast to many current methods, and are thus considerably safer as well as being faster and more economic.

Figure 6:
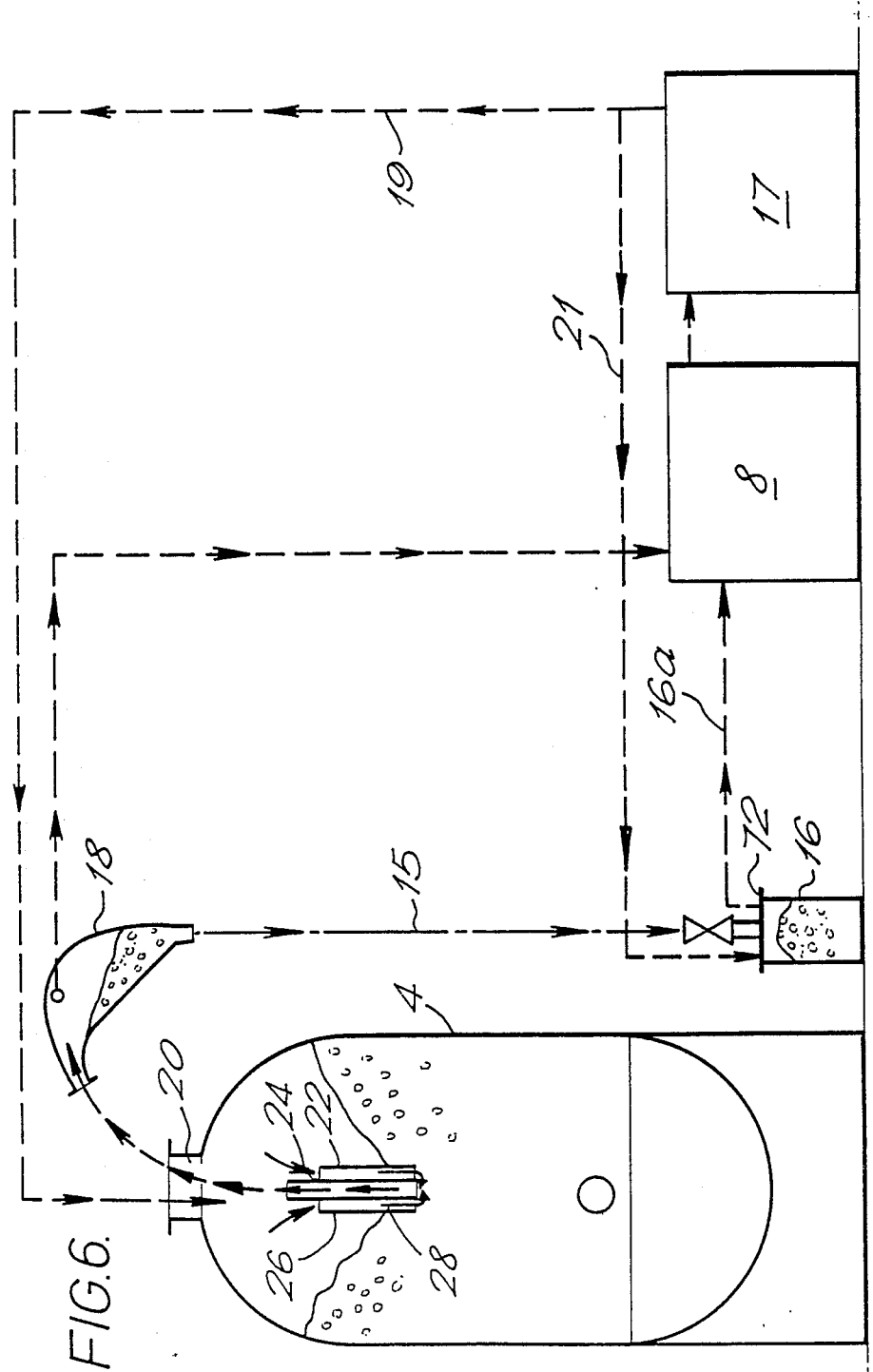
FIG. 6 is similar to FIG. 1 showing an alternative system according to the invention.

FIG. 6 illustrates a closed system similar to that shown in FIG. 1 but in this case employing a top extraction method. Like numerals will be used for like parts. A separator hopper 18 is connected via the top port 20 of the convertor 4 to a self feeding nozzle 22 which comprises an inner pipe 24 for extracting catalyst within a concentric outer pipe 26 for supplying gas. Thus gas is drawn down the annular space 28 surrounding the inner pipe 24 to the nozzle orifice where it entrains catalyst which is withdrawn up the inner pipe 24 and taken to the separator hopper 18. In the latter separator hopper 18, the catalyst falls to the bottom and is withdrawn down the pipe 15 to the drum filler unit 16 while the gas is returned to the vacuum unit 8. The nozzle 22 is self feeding and does not require an operator to be present inside the convertor 4 standing on the catalyst bed as with many existing methods of catalyst removal. This naturally increases the safety aspect of the method and apparatus according to the present invention.

Figure 7:
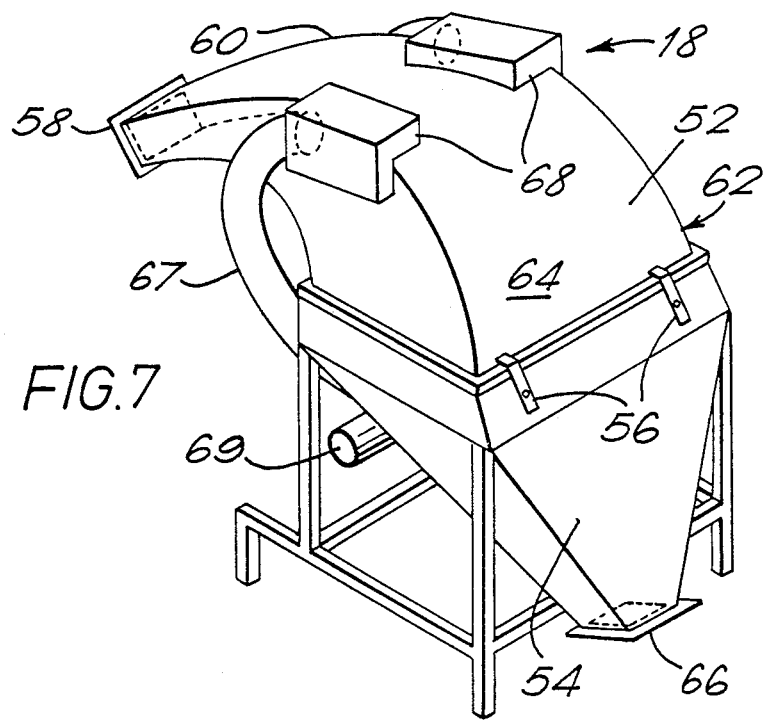
FIG. 7 is a perspective view of a separating hopper for use in the system of FIG. 6.
Figure 9:
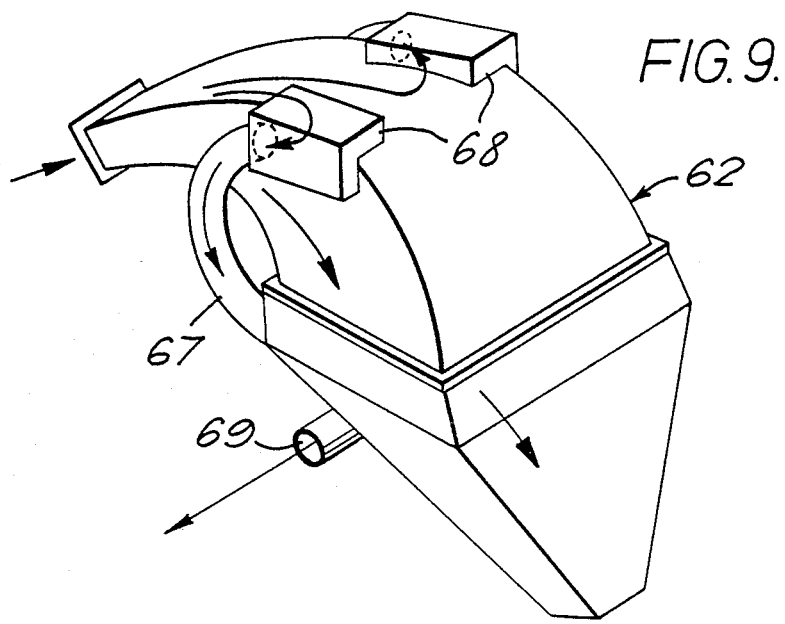
FIG. 9 is a similar view to that of FIG. 7, illustrating gas flow pipes.
Figure 8:
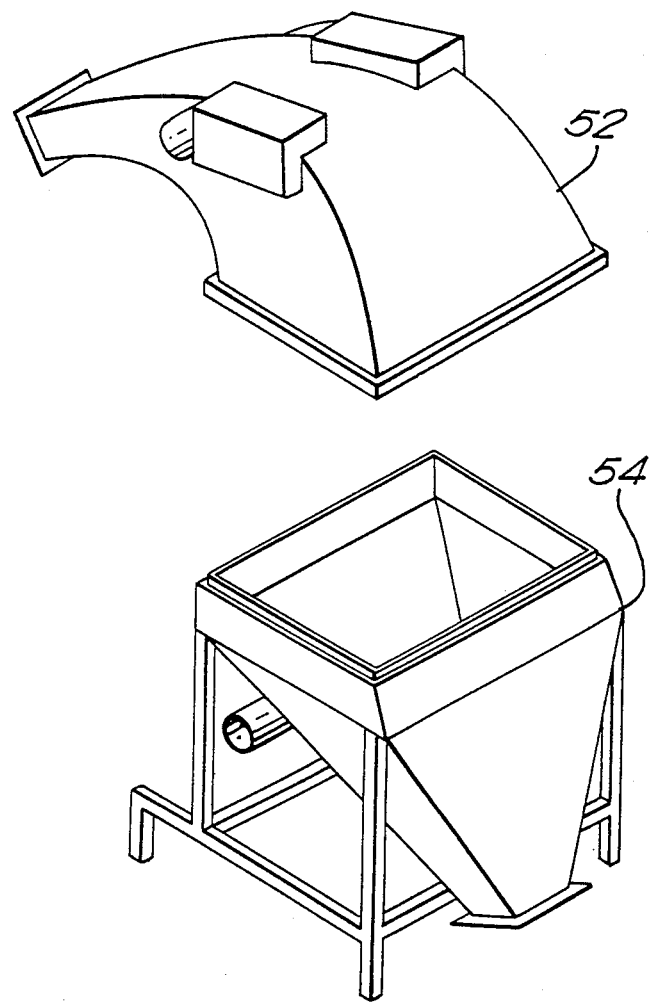
FIG. 8 is a separated view of the components of the hopper of FIG. 7.

Referring to FIGS. 7 to 9, a separator hopper for use in the system of FIG. 6 comprises upper and lower sections 52,54 respectively. The sections 52,54 are formed with complementary shapes so that they mate and seal together, being held in place by means of clamps 56. An inlet 58 for the pneumatically conveyed solids is provided. The inlet 58 gradually widens out at 60 into a central chamber 62, the upper surface 64 of the chamber 62 being continuously curved away from the inlet 58. The lower section 54 comprises a hopper having an outlet 66 from which separated solids can be removed. At the top of the chamber 62 there are two gas outlets 68 connected by suitable pipes 67 to a common duct 69 for removal and re-cycling of the pneumatic gas.

In operation the inlet 58 receives the dispersed gas and solids which, as the inlet widens out at 60, reduces in velocity. The solids describe an arcuate path tending to follow the line of curvature of the upper surface 64 of the chamber 62 although with the bulk of the solids not actually touching the upper surface of the chamber. The gas is extracted through the exit ports 68 and the solids continue to fall into the lower section 54 which acts as a hopper for them. The solids may be continuously extracted through the outlet 66 and the gas is re-cycled through duct 69 and into the system for reuse.

The separator hopper of FIGS. 7 to 9, in being at the top of the catalytic convertor, is close as possible to the source of pneumatically conveyed solids. This means that the solids will have been subjected to the minimum attrition before entering. The design of the separator hopper ensures that the solids are separated without using baffles, deflectors or abrasive cyclonic methods as previously employed and thus subject fragile catalytic pellets, for example, to the minimum of damage. Solids removed from the outlet 66 may be conveyed away at low velocity preventing further damage from occurring. A fine mesh may be located at or near the upper surface 64 of the chamber 62 in the vicinity of the gas outlet ports 68 to ensure that any stray particles are not inadvertently carried through the gas outlet ports 68, but if should be emphasised that the main separation is not effected by the mesh but by the trajectory of the solid particles within the separator hopper. This separator hopper therefore provides a simple and inexpensive solution to the problem of separating in particular pellets while ensuring that the minimum of attrition occurs.

Figure 10:
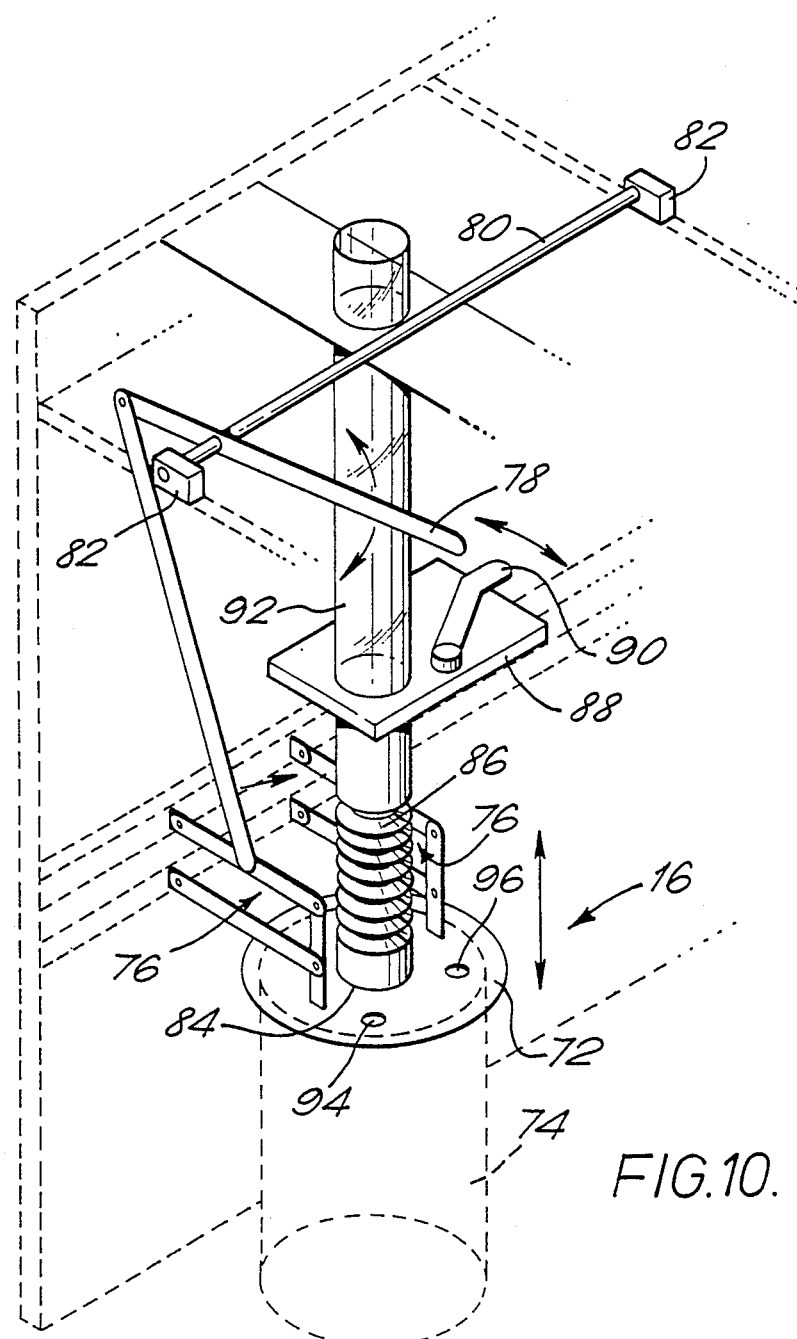
FIG. 10 is a diagrammatic perspective view of an exemplary drum filler for use in the method according to the invention.

Referring to FIG. 10, an example of drum filler unit 16 is shown, comprising a circular plate 72 adapted to fit over and mate with the opening of a drum or other container 74. The plate 72 is mounted on parallel linkages 76 to enable it to be moved towards and away from the opening of the drum or other container 74 while being maintained effectively horizontal. The linkages 76 are operated by means of a manual lever 78 operating through a pivot bar 80 mounted in bearing blocks 82.

The plate 72 has a main central opening 84 being a solids inlet. This is connected via a length of flexible convoluted hose 86 to a valve plate 88 provided with a shut-off valve operated by a lever 90. The valve plate 88 is in turn connected to the rest of the system by means of a tube 92 which is at least partly transparent or semi-transparent so that an operative can view the passage of solids therethrough.

The plate 72 is also provided with a gas inlet port 94 fed by a gas inlet line such as the line 21 in FIG. 1 and a gas outlet port 96 having a gas outlet line such as the line 16a in FIG. 1. The underside of the plate 72 is also provided with a suitable sealing material shown schematically as 73 in FIG. 1 so as to sealingly engage the upper rim of the drum 74 when in position thereon.

The operation of the drum filler device 70 is as follows. An empty drum 74 is positioned beneath the circular plate 72 and the lever 78 operated to bring the plate 72 into sealing engagement with the upper rim of the drum 4. At this point, the ports 94 and 96 are connected to a supply of the inert gas and to the vacuum unit respectively. Inert gas may be introduced into the drum to purge any air present. In any event the vacuum unit is connected via the port 96 to lower the pressure within the drum 74. The handle 90 may then be operated to open the valve in the valve plate 88 and allow particulate catalyst to pass from the tube 92 through the inlet 94 into the drum 74. The pressure within the drum 74 is maintained at the desired level by balancing the inlet of inert gas through the port 94 with the vacuum through the port 96. Once the drum is full, as seen by the operator when solids cease to move through the transparent section of the tube 92, the valve in the valve plate 88 is shut off by means of a handle 90 isolating the drum 74 from the rest of the catalyst transport system. The vacuum port 96 can be shut off and nitrogen or other inert gas allowed to bleed into the drum 74 until atmospheric pressure is reached. At this point the handle 78 may be operated once again to move the circular plate 72 upwardly and allow the drum 74 to be removed from beneath the drum filler device 16 and sealed. A fresh empty drum is placed in position and the cover plate 72 is lowered into sealing engagement once more. This cycle may be repeated until all the catalyst has been transferred to sealed drums.

It will be observed from the systems of both FIGS. 1 and 6 that the entire system in each case forms a closed circuit including the catalyst drum being filled at the time. When it is necessary to change a drum this system can be isolated by means of valves. Thus where catalysts need to be removed under an inert gas, as is usually the case, the system of the invention is ideal. Also, the system of the invention being entirely closed, reduces or substantially eliminates emission of dust.

Thus the system of the invention provides improved efficiency and safety over current methods of discharging catalysts from catalytic reactors.

What is claimed is:

1. A method of discharging particulate material from a reactor, which comprises:
    (a) providing a drain zone in said reactor and a gas/solids separator for operation on particulate material from said reactor and pneumatically conveying said particulate material from said drain zone of said reactor via a first vacuum line, to said gas/solids separator;
    (b) providing a receiving vessel, having a top portion, for receiving said particulate material from said gas/solids separator and arranging a cover member having a gas inlet, a gas outlet and an inlet port in sealing engagement on the top portion of the receiving vessel, feeding said particulate material from said gas/solids separator to said receiving vessel via a substantially gas-tight line from said gas solids separator to said inlet port;
    (c) recycling the majority of the gas from said gas/solids separator to said drain zone via a main vacuum return line;
    (d) drawing substantially the remainder of the gas from said gas/solids separator to said receiving vessel via a further vacuum line and the gas inlet provided on said cover member; and
    (e) passing gas from said receiving vessel, via the outlet port provided on said cover member and an auxiliary vacuum return line, to said main vacuum return line, said cover member being mounted for movement towards and away from said receiving vessel such that successive ones of a series of receiving vessels can be selectively covered by said cover member and filled with said particulate material.

2. A method according to claim 1, including providing said receiving member with a substantially horizontal rim and wherein said cover member is mounted on parallel linkages for movement towards and away from the substantially horizontal rim of said receiving vessel such that said cover member remains substantially parallel to said rim during said movement.

3. A method according to claim 2, in which said linkages are operated by means of a lever acting via a pivot bar mounted in spaced bearing members.

4. A method according to any of claims 1 to 3, in which said sealing engagement is provided by a sealing member provided on the undersurface of said cover member.

5. A method according to claim 4, in which said first vacuum line has therein a vacuum unit and a heat exchanger, in that order.

6. A method according to claim 3, in which said first vacuum line has therein a vacuum unit and a heat exchanger, in that order.

7. A method according to claim 2, in which said first vacuum line has therein a vacuum unit and a heat exchanger, in that order.

8. A method according to claim 1, in which said first vacuum line has therein a vacuum unit and a heat exchanger, in that order.

9. A system for discharging particulate material from a reactor, comprising:
   (a) a drain zone in said reactor and a gas/solids separator for operation on particulate material from said reactor, a first vacuum line for pneumatically conveying said particulate material from said drain zone of said reactor to said gas/solids separator;
   (b) a receiving vessel for receiving said particulate material from said gas/solids separator, said receiving vessel having a top portion and a cover member in sealing engagement with said top portion, said cover member having a gas inlet, a gas outlet and an inlet port, a substantially gas-tight line for feeding said particulate material from said gas/solids separator to said receiving vessel via said inlet port provided on said cover member;
   (c) a main vacuum return line for recycling the majority of the gas from the gas/solids separator to said drain zone;
   (d) a further vacuum line for drawing substantially the remainder of the gas from the gas/solids separator to said receiving vessel via said gas inlet provided on said cover member; and
   (e) an auxiliary vacuum return line for passing gas from said receiving vessel, via said gas outlet port provided on said cover member, to said main vacuum return line, said cover member being mounted for movement towards and away from said receiving vessel such that successive ones of a series of receiving vessels can be selectively covered by said cover member and filled with said solids.

10. A system as claimed in claim 9, wherein said reactor has an outlet port, said system comprising a hopper having an end plate fitting the outlet port of the reactor, a material outlet for removing material from the hopper, and a gas outlet for flow of gas from the hopper.

11. A system as claimed in claim 9, comprising a separating hopper having a top with upper surfaces and a bottom and an inlet for pneumatically conveyed particulate material, said inlet widening out into a central chamber where the solids tend to drop to the bottom, the central chamber being provided with a gas outlet proximate the top thereof and a particulate material outlet at or near the bottom thereof, the upper surfaces of the chamber being continuously curved away from the inlet.

* * * * *